United States Patent [19]
Buske et al.

[11] Patent Number: 5,235,150
[45] Date of Patent: Aug. 10, 1993

[54] OPEN DECK REMOVABLE COVER MICROWAVE OVEN

[76] Inventors: Norm Buske, HCR Box 17, Davenport, Wash. 99122-9404; Tamara A. Buske, 1630 SW. Clay, Apt. 5G, Portland, Oreg. 97201

[21] Appl. No.: 803,271

[22] Filed: Dec. 3, 1991

[51] Int. Cl.⁵ .................... H05B 6/80; A47J 36/38
[52] U.S. Cl. .................... 219/10.55 R; 219/10.55 A; 219/10.55 D; 219/10.55 F; 99/DIG. 14; 99/330; 99/346; 220/211
[58] Field of Search ........... 219/10.55 R, 10.55 F, 219/10.55 M, 10.55 D, 10.55 A, 400; 99/DIG. 14, 330, 346; 126/21 H, 21 R; 220/211

[56] References Cited
U.S. PATENT DOCUMENTS

| | | | |
|---|---|---|---|
| 4,310,739 | 1/1982 | Hatem | 219/10.55 A |
| 4,332,993 | 6/1982 | Shibahara et al. | 219/10.55 R |
| 4,580,023 | 4/1986 | Simpson | 219/10.55 R |
| 4,817,509 | 4/1989 | Erickson | 219/400 |
| 4,908,488 | 3/1990 | Park | 219/10.55 R |
| 5,061,448 | 10/1991 | Mahe et al. | 219/400 |
| 5,129,536 | 7/1992 | Robinson | 220/211 |

Primary Examiner—Bruce A. Reynolds
Assistant Examiner—Tu Hoang
Attorney, Agent, or Firm—Wells, St. John, Roberts, Gregory & Matkin

[57] ABSTRACT

A microwave heating appliance 10 has a base 12 mounted in an opening 18 formed in a countertop 16. Base 12 includes a mount, such as flange 20, which supports the base on the countertop. A removable cover 14 sits on the base 12 above countertop 16. The cover and base form a microwave heating chamber. A deck 26 is in base 12 and is approximately level with countertop 16. Deck 26 and countertop 16 form a continuous counter surface when cover 14 is fully removed from base 12. A microwave generating device 24 generates microwave radiation which passes through deck 26 to the heating area. A control system 80 is employed to control microwave generating device 24 to only allow operation when cover 14 is properly connected to base 12.

30 Claims, 4 Drawing Sheets

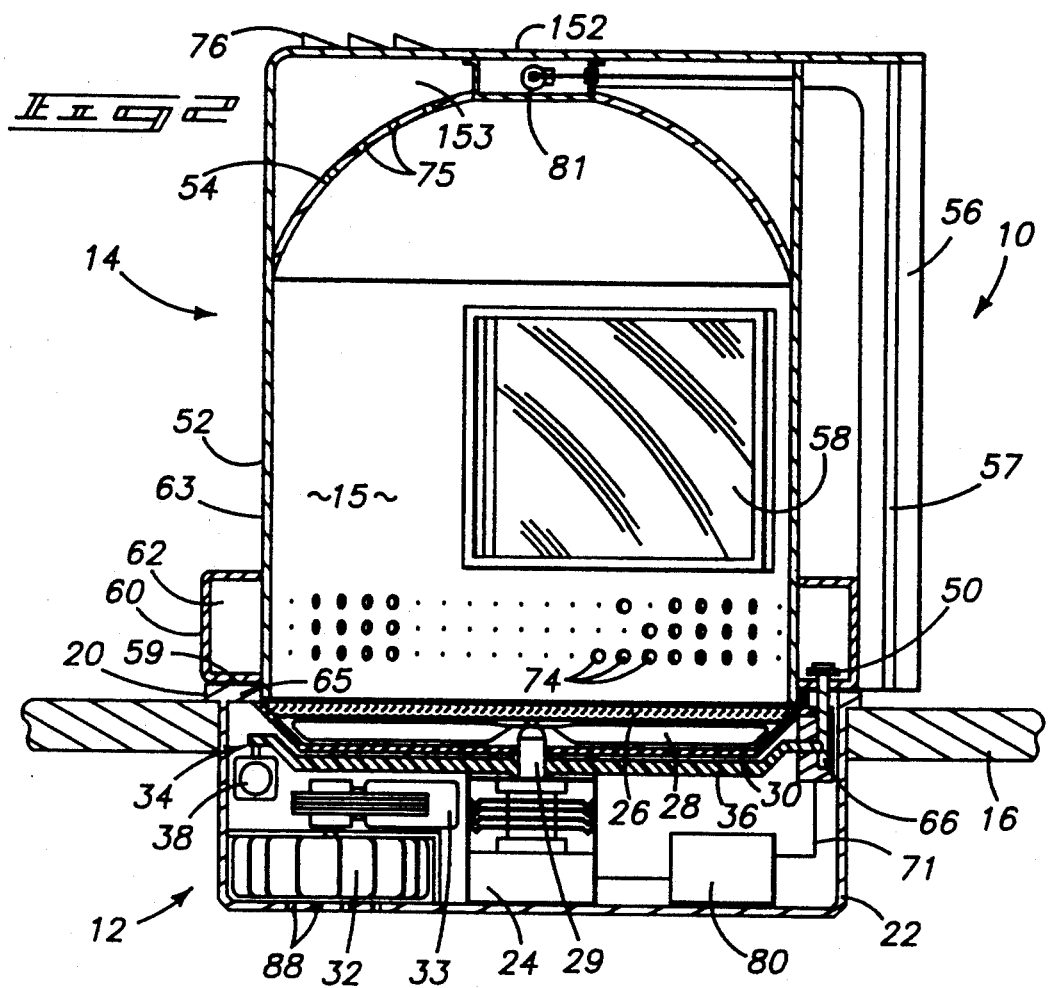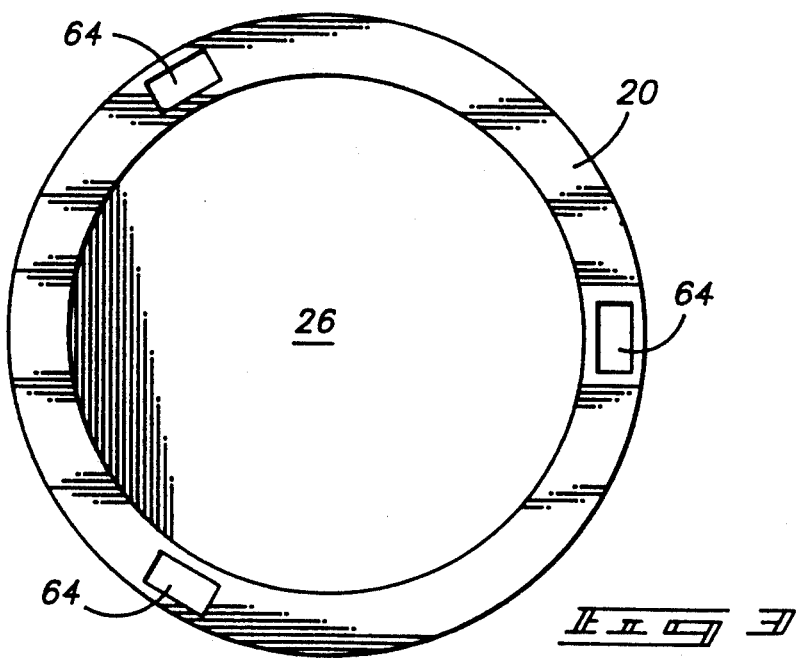

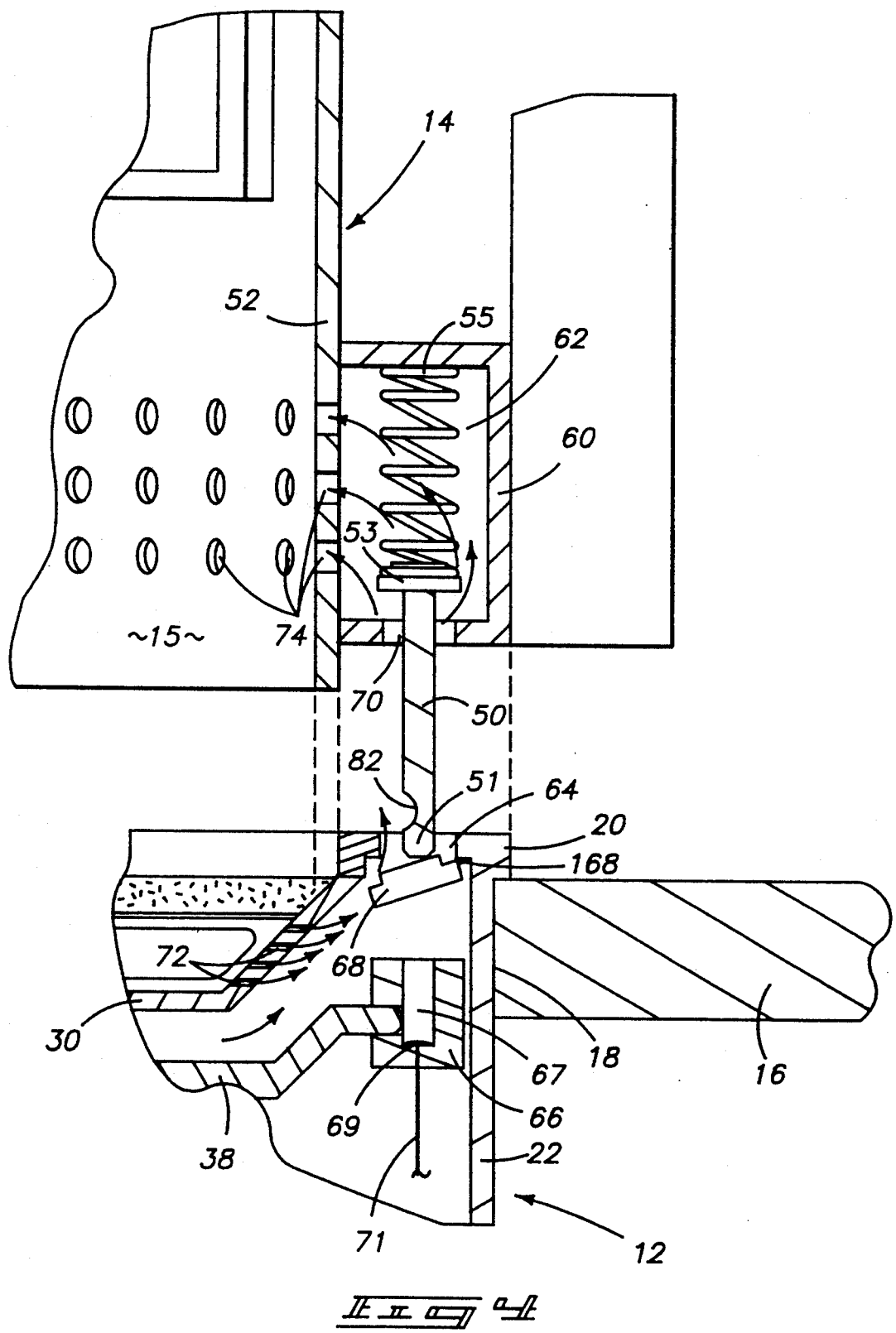

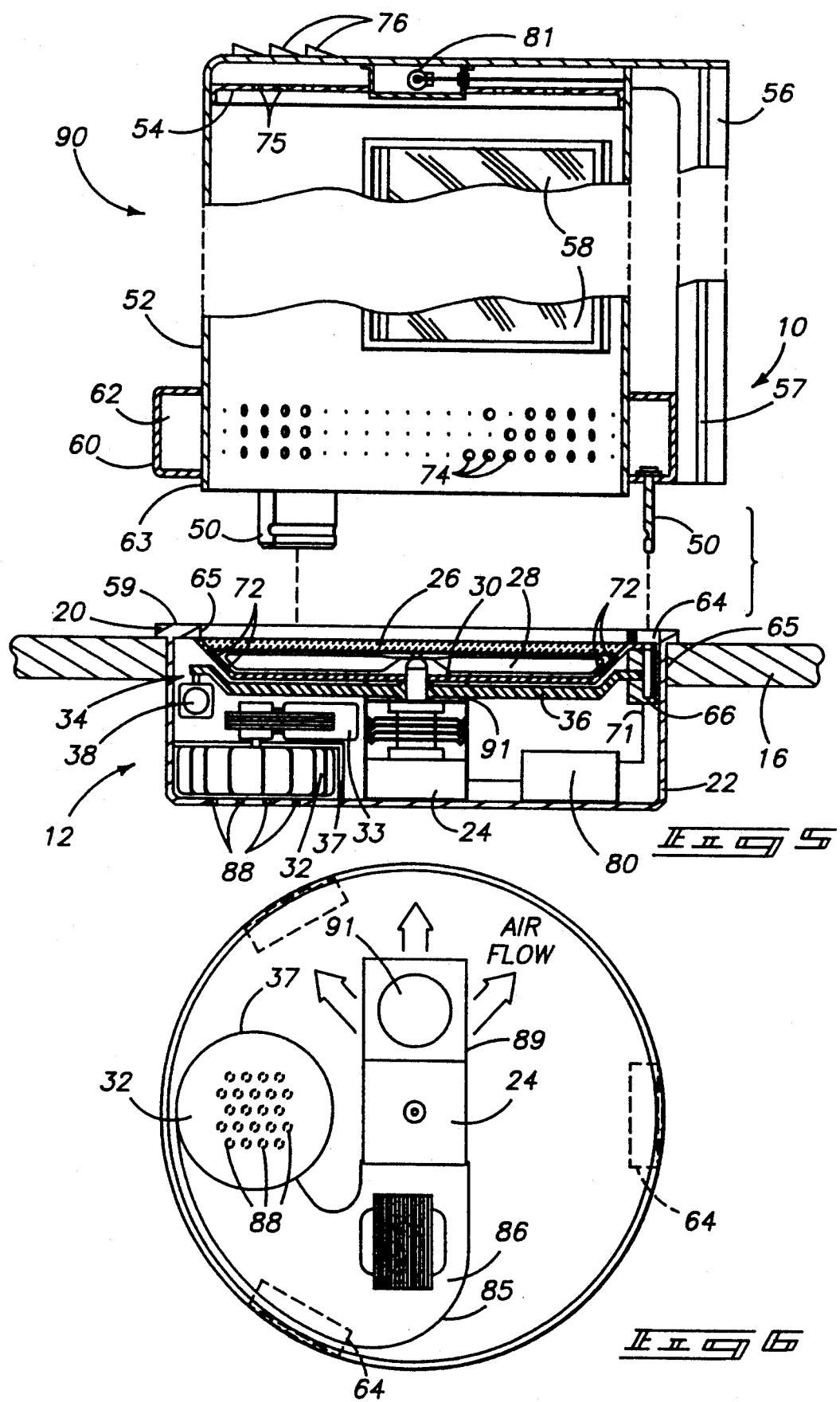

OPEN DECK REMOVABLE COVER MICROWAVE OVEN

TECHNICAL FIELD

The present invention relates to a microwave heating appliance.

BACKGROUND OF THE INVENTION

Microwave ovens heat material with microwave radiation which electrostatically changes the orientation of polar molecules in the material. Microwave heating is very rapid because the microwave radiation goes directly to the molecular structure of the material. This is accomplished without introduction of any heating element into the material. It is also done without passing electrical current through the material for resistive heating.

Heating with microwave radiation is advantageous over other techniques, such as baking, broiling, or boiling, because the material is heated without the container being heated to temperatures in excess of the material. As a result, a wide variety of containers which do not tolerate high temperatures may be used to hold materials during microwave heating.

Despite the desirable features, microwave ovens suffer from several practical problems. A principal problem is that the microwave oven occupies a substantial space which cannot conveniently be recovered for other uses. For example, a portable microwave oven may consume a substantial portion of a kitchen countertop. Microwave ovens are typically too heavy and bulky to be removed easily from the countertop when the additional countertop space is desired.

One prior approach to the space problem was to mount the microwave oven in kitchen cabinetry, such as below an upper set of cabinets. Another approach uses an exhaust hood and microwave combination which mounts above a conventional electric stove. Although each of these approaches remove the microwave oven from the countertop, they merely relocate the microwave oven to another kitchen space. Accordingly, a large volume of kitchen space is still dedicated to the microwave oven.

Another problem experienced by prior microwave ovens is the lack of user accessibility to the material being heated in the oven. For example, the user must typically remove the container from the microwave oven to stir the contents. Removal is also typically needed to determine whether the contents are sufficiently cooked or heated. The user must then replace the container to complete the cooking process.

A third problem facing prior microwave ovens is the relative difficulty of cleaning the oven interior. Portions of the microwave ovens, such as microwave stirrers, rotating tables, and air-flow holes in the oven surface, provide irregular surfaces which are commonly exposed to accidental spills. Unfortunately, these areas are difficult to clean.

Microwave cooking appliances built according to the present invention provide the benefits of microwave heating while eliminating or minimizing the practical drawbacks concerning occupation of counter space, limited accessibility to the material being heated, and difficulty in cleaning interior surfaces of the appliance.

BRIEF DESCRIPTION OF THE DRAWINGS

The preferred embodiment of the invention is described below with reference to the following drawings, wherein like numerals reference like elements, in which:

FIG. 2 is a side sectional view of the microwave oven shown in FIG. 1 with the cover engaging the base;

FIG. 3 is a top view of the base portion;

FIG. 4 is an enlarged sectional view of a pin and interlock system included in the appliance of FIG. 1;

FIG. 5 is a side sectional view of an alternative microwave heating appliance according to this invention having a modified cover; and, FIG. 6 is a top diagrammatic view of the base portion illustrating cooling air flow within the base portion.

DETAILED DESCRIPTION OF THE PREFERRED EMBODIMENTS

Figure 1:
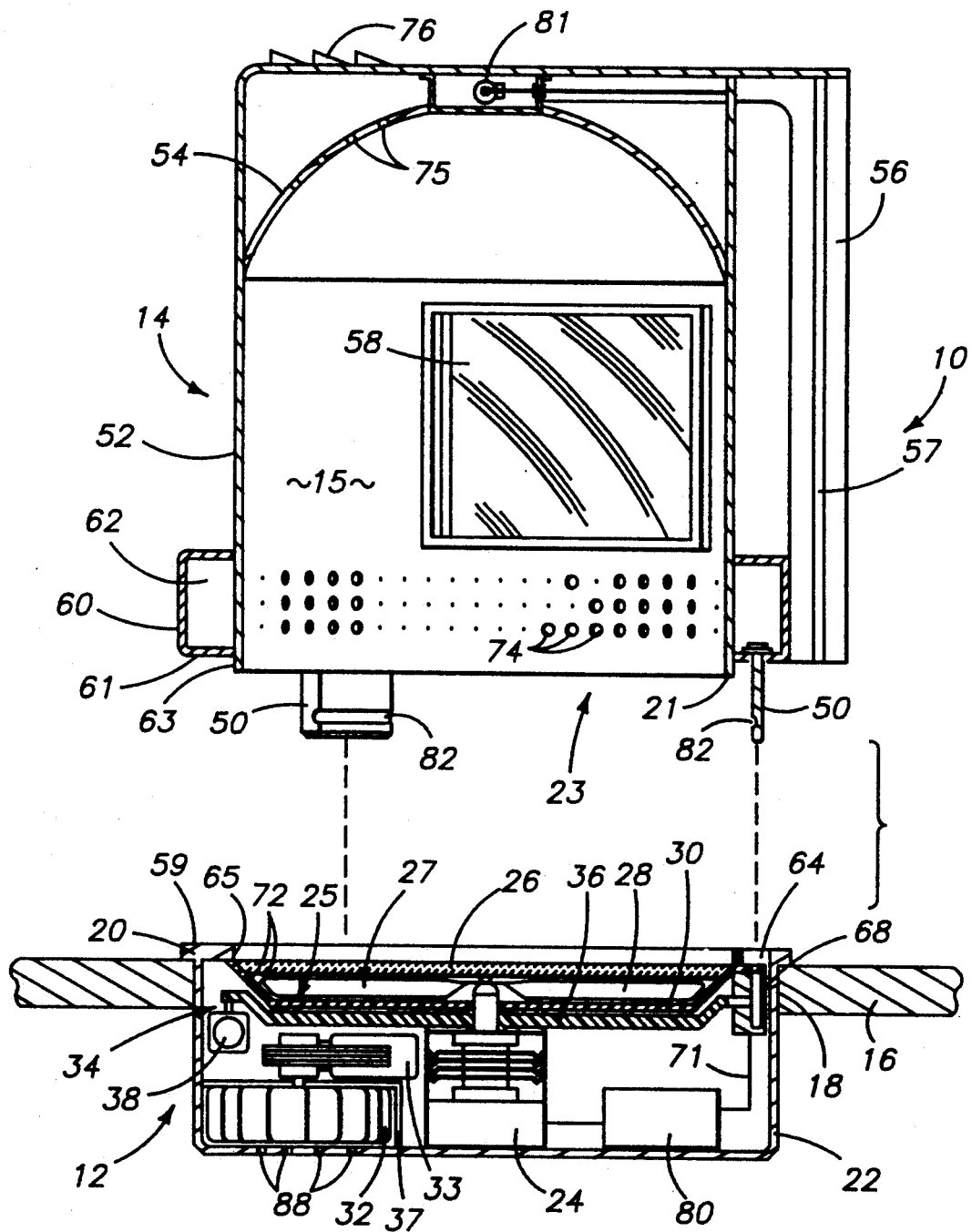
FIG. 1 is a side sectional view of a microwave heating appliance according to the present invention illustrating a cover portion removed upwardly from a base portion.

This disclosure of the invention is submitted in furtherance of the constitutional purposes of the U.S. Patent Laws "to promote the progress of science and useful arts" (Article 1, Section 8).

FIGS. 1 and 2 show a microwave heating appliance 10. Microwave appliance or oven 10 includes a base portion 12 and a removable cover portion 14. Cover 14 is detachably connectable to base 12. A microwave heating chamber 15 is defined within the cover and above the base. Cover 14 can be disconnected, disengaged and fully removed from base 12, as shown in FIG. 1. In the heating mode of operation, cover 14 is connected to base 12 as shown in FIG. 2.

Base 12 is constructed for mounting in a counter substantially beneath a planar countertop 16 through an opening 18 formed in the countertop. Base 12 includes a housing 22 which mounts the appliance and contains operable components of microwave oven 10. Base 12 also advantageously includes a mount, such as flange 20, for mounting the base to a counter. Flange 20 advantageously extends onto countertop 16 to support base 12 in opening 18. Flange 20 is preferably integral with housing 22.

A microwave generating device 24 is connected to base 12 and preferably positioned centrally in housing 22 to generate microwave radiation used to cook materials in microwave oven 10. Preferably, the microwave generator 24 is a magnetron which generates electromagnetic radiation in the microwave range of the spectrum.

Base 12 also includes a deck 26 disposed above microwave generator 24. Deck 26 serves as a microwave heating chamber floor. Deck 26 is encircled by flange 20 and is used to support the food or other oven contents to be heated. The volume beneath cover 14 and above deck 26 define the substantially enclosed microwave heating or radiation chamber 15. Deck 26 is formed of a material which is permeable to microwave radiation. Preferably, deck 26 is formed of ceramic, glass or other suitable microwave radiation transmissive materials. Because deck 26 passes the microwave radiation and is preferably not significantly heated by the microwave radiation, the user may touch or even place combustible materials on deck 26 after the microwave oven has been used.

Base 12 is mounted in opening 18 of countertop 16 such that deck 26 is approximately level with countertop 16. Deck 26 can therefore function as a countertop surface when cover 14 is removed and/or remotely stored. When cover 14 is removed and microwave oven 10 is not being used, deck 26 and countertop 16 provide a substantially continuous counter surface which is preferably interrupted only by flange 20. A microwave guide 25 is included between the microwave generator 24 and the heating chamber 15. The microwave guide includes a wave guide wall 30 which is transmissible to microwaves. A wave guide chamber 27 is formed beneath deck 26 and above the wave guide wall 30.

A wave dispersing device 28 is preferably included between the microwave generating device 24 and chamber 15, such as in wave guide chamber 27. Wave disperser 28 more evenly disperses the microwave radiation generated by microwave generating device 24 and delivered into chamber 15. Preferably, wave disperser 28 is a microwave stirrer having a rotating blade assembly which pivots about pivot shaft 29 under the force of air flow against the blade assembly. Air is preferably ducted into the wave guide chamber 27. Deck 26 and wall 30 also serve to help even the microwaves beamed to chamber 15, as explained more fully below.

A fan 32 is preferably positioned adjacent microwave generating device 24 to transfer air through heating chamber 15 and supply cooling air over microwave generator 24. Fan 32 is driven by motor 33 and enclosed within fan enclosure 37. Wave guide wall 30 has apertures 72 formed about its periphery to allow flow of air from wave guide chamber 27 and about stirrer 28. The air flow throughout microwave oven 10 will be described below in more detail with reference to FIGS. 4-6.

Cover 14 and base 12 are preferably adapted to allow properly oriented engagement and positive connection of the cover with the base. This is preferably done using a cover engagement construction which registers the cover in a defined location or set of locations relative to the base. This engagement and registration construction are preferably accomplished in the form of an interlock system which both detects when the cover is positioned properly on the base and secures the cover to base 12. The interlock system advantageously prevents operation of microwave oven 10 until the cover 14 is properly positioned on base 12.

As shown, cover 14 has three cover extensions or pins 50 and base 12 has three corresponding receptacles 65 which receive the cover extensions. Flange 20 of base 12 is provided with three apertures 64 which define the openings to receptacles 65. The receptacles preferably mount interlocks 66. Interlocks 66 advantageously each include features providing both a cover positioning sensor 69 and a cover lock 34 which detect when the cover is in an engaged or heating position and secure the cover in that position, respectively. Pins 50 are inserted through apertures 64 to engage or otherwise activate switch interlocks 66. Most preferably, the three pairs of pins 50 and switch interlocks 66 are spaced equiangularly around the periphery of microwave oven 10 as illustrated in FIG. 3. The engagement between extensions 50 and receptacles 65 helps ensure that cover 14 is properly positioned on base 12.

The interlock system cover lock 34 secures cover 14 onto base 12 when microwave oven 10 is in use. As shown, cover lock 34 comprises a locking member 36 and a solenoid 38 or other suitable lock activator for moving the locking member. The locking member advantageously is shaped generally like a starfish and mounted to pivot about a locking member pivot axis defined by a suitable shaft, such as shaft 29 of the microwave stirrer 28. The locking member preferably includes spokes which extend outwardly to distal ends which engage recesses 82 (see FIG. 4) formed in the cover pins. The distal ends are controllably rotated between engaged locking positions and released or disengaged positions using the lock solenoid 38 or other suitable lock activator. The individual spokes or other locking elements of locking member 36 are preferably provided for each receptacle 65 and corresponding cover retaining and positioning extension 50.

FIG. 4 shows in more detail the interlock system employed in a preferred embodiment of the present invention. As cover 14 is lowered onto base 12, pins 50 initially engage movable flaps 68. Flaps 68 are mounted by pivots 168 to flange 20. Pins 50 are biased outwardly by springs 55 to project from microwave seal 60. Flaps 68 are preferably biased to close apertures 64 and prevent particles or the like from entering base 12. Flaps 68 may alternatively be biased and mounted in a vertical manner or biased about a hinge at the end of the flaps.

Pin 50 is received within a locking recess 67 formed in switch interlock 66. When pin 50 is properly inserted into switch interlock 66, a tip 51 of pin 50 depresses electrical contact 69 or is otherwise sensed. Engagement outputs a signal over conductor 71 to control system 80. The cover engagement sensor may be placed in other positions, such as on flange 20 for activation by proximity of microwave seal 60. Other cover sensing techniques may be employed in lieu of electrical contact switch 69.

As shown, pin 50 bottoms out within receptacle 67 before cover 14 is completely lowered onto base 12. Therefore, as cover 14 is lowered farther onto base 12, pin 50 is forced upwardly into choke cavity 62 against the biasing action of cover extension biasing springs 55. As a result, a cap 53 of pin 50 is lifted to open an aperture 70 formed in choke seal 60. This forms an automatically opening air valve which opens in response to engagement of the cover with the base. When cover 14 is positioned on base 12 and microwave oven 10 is in operation, an air duct is formed through apertures 72 provided in chamber floor 30, aperture 64 in flange 20, aperture 70 in choke seal 60, and apertures 74. The air duct passes the air (as indicated by the arrows) from base 12 to microwave chamber 15 within cover 14. FIG. 2 shows that air is then passed through apertures 75 in chamber ceiling 54 and exhausted from cover 14 through exhaust vents 76. The hot air carries with it water vapor or other moisture which is typically given off by the food or other materials being heated. The circulation of air through cover 14 is therefore important to remove moisture from within the corner 14.

When cover 14 is connected to base 12, cover lock 34 secures cover 14 to base 12. Solenoid 38 of cover lock 34 rotates locking members 36 to engage a notch 82 in pins 50 and thereby lock pins 50 into respective switch interlocks 66. Handle 56 may be equipped with a proximity switch 57, or the like, which detects the presence of a human hand or touch. When the user grasps handle 56 to remove cover 14, the proximity switch can trigger disengagement of cover lock 34.

Although the preferred embodiment is described as including an interlock system which has pins, interlock switches, and a cover lock, the present invention contemplates other arrangements. For example, the interlock system may comprise a capacitive or proximity switch positioned in base 12 which is triggered to permit operation of microwave oven 10 when cover 14 engages base 12. In place of a cover lock having spoked locking members and a solenoid, individually operated electrical locking devices may be employed. Alternatively, cover 14 may be adapted with a lip or recess and base 12 may be adapted with a locking protrusion which extends over the lip or into the recess to fasten securely cover 14 onto base 12. As another alternative, fasteners which must be manually operated to hold cover 14 onto base 12 may be employed.

Cover 14 has a bottom cover opening 23 defined by cover bottom rim 21 which engages with the upper surfaces of base 12 along deck 26. Cover 14 includes a chamber wall 52 and a chamber ceiling 54 which are substantially impervious to microwave radiation. Chamber ceiling 54, chamber wall 52, and housing 22 define a microwave radiation chamber when cover 14 is positioned on base 12. A window 58 is advantageously provided in chamber wall 52 so that a user may view the heated contents during the heating process. Window 58 is screened with a microwave reflecting screen (not shown). Cover 14 also includes a handle 56 which permits a user to remove cover 14 from base 12.

A microwave choke seal 60 is preferably provided about the cover opening along the exterior of chamber wall 52. Microwave choke seal 60 is an annular conduit that captures microwave radiation which escapes from the microwave chamber through apertures 74 and beneath rim 21. Choke seal 60 is dimensioned to provide a quarter-wave choke cavity 62 which traps and attenuates escaping microwave radiation. Choke cavity 62 also provides a space for retraction of pins 50. It further forms an air duct which communicates air from base 12 to cover 14.

The bottom face 61 of the choke seal further serves as an abutment which rests upon the upper face 59 of flange 20. When cover 14 is engaged with base 12 in the engaged or heating position shown in FIG. 2, an outer surface 63 of chamber wall 52 abuts an inner surface 65 of flange 20 of base 12. This radially positions the cover relative to the base.

Cover 14 also includes heating chamber air inlet apertures 74 provided in chamber wall 52 to permit air flow from choke seal 60 to the heating area inside of cover 14. Further, cover 14 has air exhaust apertures 75 formed in chamber ceiling 54 and an exhaust vent 76 to exhaust warm, moist air from the heating area. The double wall construction including ceiling 54 and the top wall 152 of cover 14 forms a microwave and accidental fire attenuating chamber 153.

Microwave oven 10 further includes a control system 80 which is preferably positioned in housing 22 of base 12. Control system 80 controls the operation of microwave oven 10. Control system 80 is coupled through conductor 71 to switch interlock 66 and is also coupled to magnetron 24. Control system 80 is also preferably coupled to other components of microwave appliance 10, including fan 32, motor 33, and solenoid 38. A wide variety of currently available microwave control systems may be employed as control system 80.

Control system 80 receives a signal via conductor 71 from cover detector switch 69 when pins 50 are inserted into switch interlock 66. This signal indicates that cover 14 is properly positioned onto base 12. The control system then preferably activates the cover lock 34 by energizing solenoid 38 and rotating the locking member to engage the cover and retain it in the cooking position. After the cover is locked, the control system 80 is activated or proceeds to control the operation of microwave oven 10 in the typical fashion, such as timed cooking at an appropriate power level. Control system 80 also typically receives input from a manual input means (not shown), such as a key switch entry pad, which allows the user to input the cooking instructions. Control system 80 controls the operation of microwave oven 10 in accordance with the instructions received from the user. When cover 14 is removed from base 12 as shown in FIG. 1, control system 80 prevents operation of microwave oven 10.

Cover 14 preferably includes an illumination lamp 81 disposed adjacent to chamber ceiling 54 to light the heating area during the cooking process. Power can be supplied to lamp 81 through any suitable detachable contacts (not shown) between the cover and base. Lamp 81 is activated when cover 14 is connected to base 12. Lamp 81 may be activated when pin 50 is inserted into switch interlock 66, for example. Additionally, cover 14 may include suitable indicators for indicating various operational parameters. An LED (not shown) positioned in a visible location can be turned on when cover 14 is positioned and locked on base 12. In addition to lamps and LEDs, other indicating devices may be employed such as a liquid crystal display, a bell, or a buzzer.

FIG. 5 shows a microwave appliance 10 having a modified cover 90. Similar features between covers 14 and 90 are labeled with similar reference numerals and the description will not be repeated. Cover 90 differs from cover 14 (FIG. 1) in that a flat chamber ceiling 84 is provided which permits the use of a larger window 58. Additionally, window 58 can be extended to near the top of cover 90. Chamber ceiling 84 has apertures 75 formed therein to permit the passage of warm, moist air from the heating chamber through cover exhaust vents 76.

FIG. 6 diagrammatically shows a preferred air flow system used in microwave oven 10. Housing 22 has air flow inlet apertures 88 formed therein adjacent fan 32. External cooling air is brought into housing 22 via inlet apertures 88. Fan 32 draws the incoming air and moves it through a duct 85. The flow through ducts passes over a transformer 86 and associated microwave generating device 24 to provide cooling thereof. A duct 89 advantageously directs all or part of the air flow upwardly through conduit 91 and into the wave guide chamber 27 to drive stirrer 28. The air then exits to the general chamber within the housing 22 of the base. The pressure developed within the chamber causes air to pass through apertures 64. Air supplied via apertures 64 continues through the air duct provided by chamber 62 of choke seal 60 (see FIG. 4). Air flows from chamber 62 into the heating chamber formed within and beneath covers 14 and 90. From the heating chambers, the air passes through outflow apertures 75 provided in chamber ceilings 54 and 84 and is exhausted through the exhaust vents 76.

The microwave oven according to the present invention is advantageous over conventional microwave ovens in that practical problems concerning the occupancy of too much counter space, limited accessibility to the cooking content, and cleaning difficulty are eliminated. The cover is completely removable from the base portion. Thus, the cover may be stored in a convenient place out of the kitchen when additional kitchen space is desired. The base portion is built into a kitchen countertop. The base portion has a deck which is substantially level with the countertop. When the cover is removed, the countertop and the deck of the microwave oven form a continuous countertop surface.

To use the microwave oven, the contents to be heated are merely set on the deck and the cover is placed over the contents onto the base. The interlock system then detects the presence of the cover and secures the cover onto the base portion. The microwave oven may then be operated to heat the contents. If the user desires to stir or test the contents, the user simply removes the cover to expose the contents. The user need not handle or remove the contents. Upon completion of cooking, the cover may be removed and stored to provide once again a continuous countertop surface. Because the deck passes the microwave radiation and is not heated thereby, the deck is safe to touch and may support combustible materials without danger of ignition immediately after the microwave oven has been used. The deck is thus a functionally safe part of the countertop and may be used for other purposes. Accordingly, the present invention provides the advantages of microwave heating without consuming a large portion of kitchen space.

In compliance with the statute, the invention has been described in language more or less specific as to methodical and structural features. The invention is not, however, limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A microwave oven comprising:
    a base having a deck for supporting material to be heated; said deck being open along sides thereof;
    a removable cover having a bottom cover opening along lower portions of the cover for engagement with the base; said cover and base defining a substantially enclosed microwave heating chamber when the cover is in an engaged position with the base, the cover being capable of complete detachment from the base during use;
    a microwave generating device connected to the base for introducing microwave radiation into the microwave heating chamber;
    a control system connected to control operation of the microwave generating device;
    a cover lock which is controlled by said control system; said cover lock being operable to provide a locked condition wherein the cover is secured to the base, and an unlocked condition wherein the cover is free to be detached from the base.

2. A microwave oven according to claim 1 wherein said control system includes means for controlling the microwave generating device which introduces microwave radiation into the microwave heating chamber only when the cover lock is in the locked condition.

3. A microwave oven according to claim 1, further comprising a cover detector for detecting when the cover is engaged with the base in an engaged position; said cover detector being connected to provide the control system with an indication of whether the cover is in an engaged position with the base.

4. A microwave oven according to claim 1, further comprising an air duct formed between the base and cover when the cover is engaged with the base for communicating air flow therebetween.

5. A microwave oven according to claim 1, further comprising:
    an air duct formed between the base and the cover when the cover is in an engaged position with the base for communicating air flow therebetween;
    an air valve which opens to allow air to flow through said air duct when the cover is an engaged position with the base.

6. A microwave oven according to claim 1, further comprising a mounting for mounting the base in a counter.

7. A microwave oven, comprising:
    a base;
    a removable cover having a bottom cover opening along lower portions of the cover for engagement with the base; said cover and base defining a substantially enclosed microwave heating chamber when the cover is in an engaged position with the base, the cover being capable of complete detachment from the base during use;
    a deck forming part of the base, the deck being transmissive of microwave radiation and open along sides thereof;
    a microwave generating device connected to the base for generating microwave radiation which passes through the deck to the microwave heating chamber;
    a cover engagement sensor for detecting when the cover is in an engaged position upon the base;
    a control system connected to the microwave generating device and cover engagement sensor; said control system comprising means for controlling the microwave generating device to prevent emission of microwaves therefrom unless the cover is in an engaged position with the base.

8. A microwave oven according to claim 7, further comprising a wave dispersing device positioned to disperse microwave radiation more evenly within the microwave heating chamber.

9. A microwave oven according to claim 7, further comprising an air duct formed between the base and cover when the cover is engaged with the base for communicating air flow therebetween.

10. A microwave oven according to claim 7, further comprising:
    an air duct formed between the base and the cover when the cover is in an engaged position with the base for communicating air flow therebetween;
    an air valve which opens to allow air to flow through said air duct when the cover is an engaged position with the base.

11. A microwave oven according to claim 7, further comprising:
    at least one engagement member;
    at least one receptacle for receiving the engagement member when the cover is in an engaged position.

12. A microwave oven according to claim 11, further comprising a cover lock which is controlled by said control system; said cover lock being operable to provide a locked condition wherein the cover is secured to the base, and a unlocked condition wherein the cover is free to be detached from the base.

13. A microwave oven according to claim 7, further comprising:

a contact member projecting from the cover;
a receptacle formed in the base for receiving the contact member;
and wherein the contact member is detected by said cover engagement detector.

14. A microwave oven according to claim 7, further comprising a flange for supporting the base in a counter.

15. A microwave oven according to claim 7, further comprising a choke seal for reducing escape of microwave radiation form the microwave heating chamber.

16. A microwave oven according to claim 7, further comprising a fan for moving air through the microwave heating chamber.

17. A microwave oven according to claim 7, further comprising an indicator device which is energized when cover is positioned in an engaged position with the base.

18. A microwave oven according to claim 17 wherein the indicator device comprises a lamp positioned in the cover.

19. A microwave oven according to claim 7, further comprising a window in said cover through which contents of the microwave heating chamber are viewed.

20. A microwave oven, comprising:
a base;
a removable cover having a bottom cover opening along lower portions of the cover for engagement with the base; said cover and base defining a substantially enclosed microwave heating chamber when the cover is in an engaged position with the base, the cover being capable of complete detachment from the base during use;
a deck forming part of the base, the deck being transmissive of microwave radiation; said deck being open along sides thereof;
a microwave generating device connected to the base for generating microwave radiation which passes through the deck to the microwave heating chamber;
a cover engagement sensor for detecting when the cover is in an engaged position upon the base;
a control system connected to the microwave generating device and cover engagement sensor; said control system comprising means for controlling the microwave generating device to prevent emission of microwaves therefrom unless the cover is in an engaged position with the base;
a cover lock; said cover lock being operable to provide a locked condition wherein the cover is secured to the base, and an unlocked condition wherein the cover is free to be detached from the base.

21. A microwave oven according to claim 20, further comprising a wave dispersing device positioned to disperse microwave radiation more evenly within the microwave heating chamber.

22. A microwave oven according to claim 20, further comprising an air duct formed between the base and cover when the cover is engaged with the base for communicating air flow therebetween.

23. A microwave oven according to claim 20, further comprising:
an air duct formed between the base and the cover when the cover is in an engaged position with the base for communicating air flow therebetween;
an air value which opens to allow air to flow through said air duct when the cover is an engaged position with the base.

24. A microwave oven according to claim 20, further comprising:
at least one engagement member;
at least one receptacle for receiving the engagement member.

25. A microwave oven according to claim 20, further comprising:
a contact member projecting from the cover
a receptacle formed in the base for receiving the contact member;
and wherein the contact member is detected by said cover engagement detector.

26. A microwave oven according to claim 20, further comprising a flange for supporting the base in a counter.

27. A microwave oven according to claim 20, further comprising a choke seal for reducing escape of microwave radiation from the microwave heating chamber.

28. A microwave oven according to claim 20, further comprising a window in said cover through which contents of the microwave heating chamber are viewed.

29. A microwave oven, comprising:
a base;
a cover having a cover opening for engagement with the base; said cover and base defining a substantially enclosed microwave heating chamber when the cover is in an engaged position with the base, the cover being capable of complete detachment from the base during use;
a deck forming part of the base, the deck being transmissive of microwave radiation;
a microwave generating device connected to the base for generating microwave radiation which passes through the deck to the microwave heating chamber;
a cover engagement sensor for detecting when the cover is in an engaged position upon the base;
a control system connected to the microwave generating device and cover engagement sensor; said control system comprising means for controlling the microwave generating device to prevent emission of microwaves therefrom unless the cover is in an engaged position with the base;
a cover lock; said cover lock being operable to provide a locked condition wherein the cover is secured to the base, and an unlocked condition wherein the cover is free to be detached from the base;
a wave dispersing device positioned to disperse microwave radiation more evenly within the microwave heating chamber;
an air duct formed between the base and cover when the cover is engaged with the base for communicating air flow therebetween;
a fan for moving air through the microwave heating chamber;
a contact member projecting from the cover;
a receptacle formed in the base for receiving the contact member;
and wherein the contact member is detected by said cover engagement detector when the cover is in an engaged position with the base.

30. A microwave oven according to claim 29, further comprising a choke seal having at least a quarter-wave choke cavity to reduce the escape of microwave radiation from the microwave heating chamber.

* * * * *